United States Patent [19]
Shinohara et al.

[11] Patent Number: 4,803,410
[45] Date of Patent: Feb. 7, 1989

[54] VARIABLE DUTY RATIO SPEED CONTROLLER FOR DC MOTORS

[75] Inventors: Shigeru Shinohara; Shun Suzuki, both of Katsuta, Japan

[73] Assignee: Hitachi Koki Company, Ltd., Japan

[21] Appl. No.: 827,194

[22] Filed: Feb. 7, 1986

[51] Int. Cl.$^4$ .............................................. G05B 5/00
[52] U.S. Cl. .............................. 318/331; 318/345 AB
[58] Field of Search .................... 318/345, 331, 345 A, 318/345 C, 345 D, 345 AB

[56] References Cited

U.S. PATENT DOCUMENTS

| | | | |
|---|---|---|---|
| 3,411,062 | 11/1968 | Kamens | 318/331 |
| 3,710,213 | 1/1973 | Hansen | 318/331 |
| 3,878,446 | 4/1975 | Brandt | 318/331 X |
| 4,241,299 | 12/1980 | Bertone | 318/331 X |
| 4,292,574 | 9/1981 | Sipin et al. | 318/331 |
| 4,325,011 | 4/1982 | Peterson | 318/331 X |
| 4,494,057 | 1/1985 | Hotta | 318/331 X |
| 4,510,423 | 4/1985 | Iwasawa | 318/331 |
| 4,511,829 | 4/1985 | Wisiniewski | 318/331 X |

FOREIGN PATENT DOCUMENTS 3013402 10/1981 Fed. Rep. of Germany .

Primary Examiner—Benjamin Dobeck
Attorney, Agent, or Firm—Lowe, Price, Leblanc, Becker & Shur

[57] ABSTRACT

A speed controller for a DC motor includes a semiconductor switching device connected in series with it in a DC power circuit. The switching circuit is turned on and off with a duty ratio variable as a function of motor load. A time constant circuit including a capacitor is connected in parallel with the switching device to develop a voltage which is compared with a reference variable between high and low levels in response to the exceedance of the varaible reference. The switching device is turned on when the voltage developed by the capacitor is higher than the lower reference voltage to energize the motor, and is turned off when the capacitor voltage is lower than the higher reference voltage to de-energize the motor. The on-duty period of the motor is variable as a function of a motor-load representative voltage developed in the switching device during its turn-on period and the off-duty period is variable as a function of a counter-electromotive force generated in the motor as inversely proportional to motor load.

11 Claims, 2 Drawing Sheets

VARIABLE DUTY RATIO SPEED CONTROLLER FOR DC MOTORS

BACKGROUND OF THE INVENTION

The present invention relates to a speed controller for controlling a DC motor to run at a constant speed, substantially irrespective of the level of load applied to the motor within a specific range of motor loads.

In the prior art, a method of DC motor speed control is known whereby an electrical generator unit, known as a tachogenerator, is attached to the body of the DC motor. This tachogenerator is employed to sense the speed of rotation of the motor, with an output voltage produced from the tachogenerator being compared with a reference voltage. The supply voltage applied to the DC motor is controlled in accordance with the result of this comparison to compensate for changes in motor speed.

With another prior art method of speed control, the power supply terminals of the DC motor are connected in one arm of a bridge circuit, and the counter electromotive force produced by the motor during rotation is sensed and compared with a reference voltage level. The result of this comparison is used to control the voltage supplied to the motor at a constant value.

One disadvantage of the first of the above prior art methods is that the axial length of the motor tends to increase. In addition, the overall control apparatus required is complex. In the case of the second prior art method, in which the DC motor is connected in one arm of a bridge circuit, a resistor is connected in series with the motor to impede high motor current with the result that a substantial amount of heat is wasted.

SUMMARY OF THE INVENTION

It is an object of the present invention to overcome the disadvantages of the prior art methods described above.

The motor is energized with a variable on-off duty ratio, with the on-duty period varying with a current passing through it and the off-duty period varying with a counter-electromotive force it develops. Since the motor current is proportional to motor load and the counter-emf is inversely proportional to the motor load, the on-duty period increases with motor load and the off-duty period decreases with t.

Specifically, the speed controller of the invention comprises a semiconductor switching device connected in series with a DC motor and responsive to a switching control signal applied thereto for switching power to the motor from a voltage source on and off, whereby a current proportional to the amount of load on the motor is generated in the motor when the power is switched on and a counter-electromotive force inversely proportional to the motor load is generated in the motor when the power is switched off. The switching control signal is generated by a circuit which is responsive to said current and counter-electromotive force for turning on the semiconductor switching device for a duration proportional to the current and turning off the switching device for an interval proportional to the counter-electromotive force.

Preferably, the switching control circuit comprises a time constant circuit including a capacitor connected in parallel with the switching device so that the switching device establishes a discharging circuit for the time constant circuit when the switching device is turned on and allows the capacitor to develop a voltage when the switching device is turned off. A variable reference source is included for generating a reference voltage variable between high and low values in response to the switching control signal. A comparator is provided for comparing said voltage with the variable reference for generating an output having one of high and low voltage levels depending on the relative value of the voltage to the variable reference and applying the output to the switching device and to the variable reference source as the switching control signal.

When the switching device is turned on in response to the high value of the comparator output, the capacitor is discharged. Since the current passing through the switching device develops a corresponding voltage therein which is proportional to the motor load and since this voltage counteracts the current discharged from the capacitor, the voltage developed at the capacitor decays at a rate proportional to the load currents. Thus, it decays at lower rates and the switching device remains conductive for a longer period during heavy motor loads than during light motor loads.

When the switching device is turned off, the capacitor is charged with a voltage which is equal to $(E-v)$, where E is the source voltage and v is the counter-electromotive force induced in the motor. Since the counter-emf is proportional to the motor speed and hence, inversely proportional to the motor load, the charging voltage tends to increase with the increase in motor load. Thus, the charging voltage rises at higher rates during heavy loads, and the switching device remains nonconductive for a smaller duration during heavy loads than during light loads.

The switching of the reference voltage between the high and low levels provides a hysteresis by which the switching device is switched at appropriate intervals for the time constant circuit. The high and low reference voltages determine the switching intervals.

It is preferred that the time constant circuit forms a filter that filters out the ripple components contained in the counter-electromotive force generated in the motor.

BRIEF DESCRIPTION OF THE DRAWINGS

The present invention will be described in further detail with reference to the accompanying drawings, in which.

DESCRIPTION OF THE PREFERRED EMBODIMENT

Figure 1:
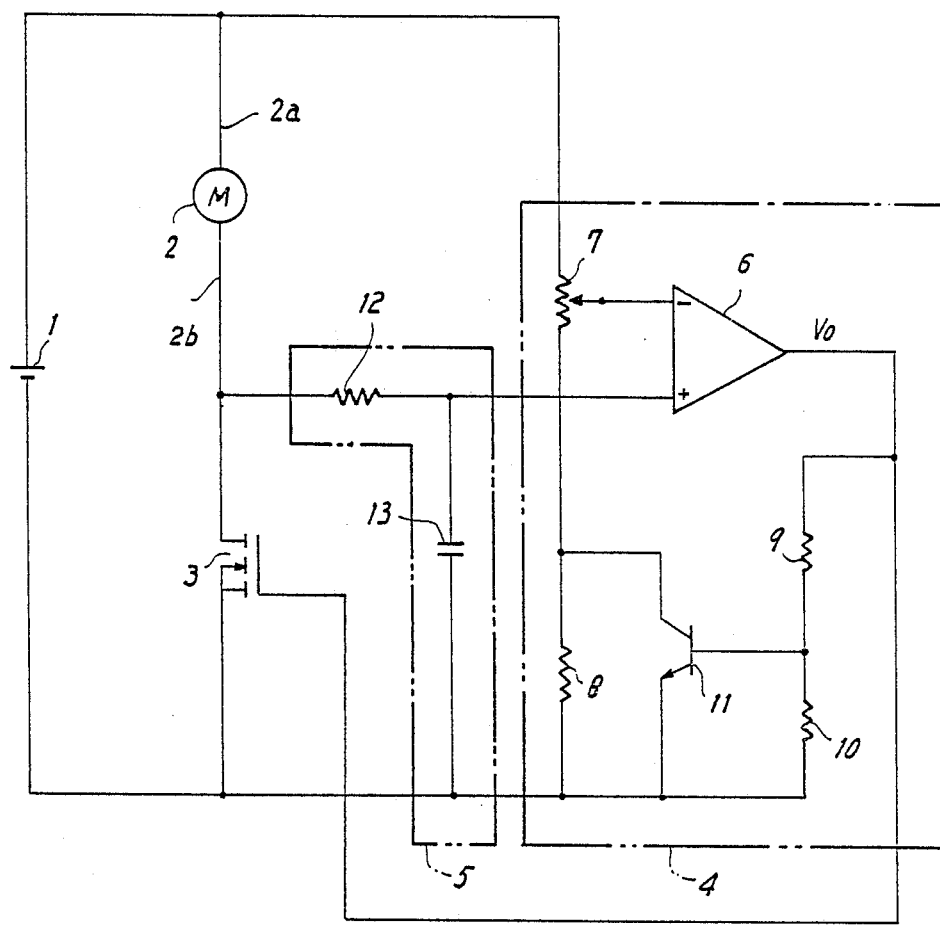
FIG. 1 is a circuit diagram of an embodiment of a DC motor speed controller according to the present invention.

FIG. 1 is a circuit diagram of an embodiment of a speed controller for a DC motor according to the present invention. Reference numeral 1 denotes a DC voltage source, numeral 2 denotes a DC motor, and numeral 3 denotes a semiconductor control element for controlling the application of a supply voltage to DC motor 2. In this embodiment, the semiconductor control element 3 is constituted by an N-channel MOS field-effect transistor. One termianl 2a of motor 2 is connected to one electrode of power source 1, while the other terminal 2b is connected to the drain of transistor 3. Reference numeral 4 denotes a comparator having a hysteresis characteristic, which includes an operational amplifier 6, a potentiometer 7 which is employed to set the desired speed of rotation of DC motor 2, a resistor 8, and resistors 9 and 10 which bias the base of transistor 11. Resistor 8 and potentiometer 7 are connected in series between the opposite terminals of DC voltage source 1. The voltage developed at potentiometer 7 is applied as a variable reference to the inverting input of operational amplifier 6. Comparator 4 further includes a transistor 11 which shunts the resistor 8 when it is turned on to switch the reference voltage at potentiometer 7 to a lower voltage $V_{ON}$ from a higher voltage level $V_{OFF}$.

A time constant circuit 5 comprising a series of resistor 12 and capacitor 13 is connected in parallel with the transistor 3 so that it is short-circuited by the transistor 3 to develop a decaying voltage when the motor 2 is energized and open-circuited to develop a rising voltage when the motor is de-energized. These voltages are applied to the noninverting input of operational amplifier 6 for comparison with the variable reference.

Operational amplifier 6 is switched to a high output state when the voltage developed at capacitor 13 drops below the low reference voltage $V_{ON}$ and switched to a low output state when the capacitor voltage rises above the high reference voltage $V_{OFF}$.

When the comparator 13 is in the high output state, transistors 3 and 11 are turned on. With transistor 11 being turned on, resistor 8 is shorted, switching the reference voltage from high level $V_{OFF}$ to low voltage level $V_{ON}$.

With the transistor 3 conducting, motor 2 is energized by a current supplied from the voltage source 1 and capacitor 13 is discharged through resistor 12 and transistor 3. Since the motor current is proportional to the amount of motor load and since this current develops a corresponding voltage across the source-drain terminals of transistor 3. This voltage, which is proportional to motor load, counteracts the discharging action of capacitor 13, the voltage at capacitor 13 decays at lower rates during heavy loads than during light loads. The turn-on time of transistor 3 is thus proportional to the motor current and hence the motor load. As a result, when motor 2 is under heavy loads transistor 3 remains in the ON state for a longer period and greater torque is generated in motor 2 than it is under light loads.

When the comparator 13 is in the low output state, transistors 3 and 11 are turned off. With the turn-off of transistor 11, motor 2 is de-energized and resistor 8 is brought into series circuit with potentiometer 7, causing the reference voltage to be switched to the high level $V_{OFF}$. With the transistor 3 being turned off, capacitor 13 is charged with a voltage which is equal to $(E-v)$, where E is the DC voltage of source 1 and v is the counter-electromotive force induced in motor 2. Since the counter-emf is proportional to the speed of the motor and hence, inversely proportional to motor load, the capacitor voltage increases with motor load during turn-off periods. Thus, the turn-off time of transistor 3 is proportional to the counter-emf. As a result, the capacitor voltage $(E-v)$ rises at higher rates during heavy loads, causing transistor 3 to remain in the OFF state for a smaller period during heavy loads than during light loads.

Figure 2:
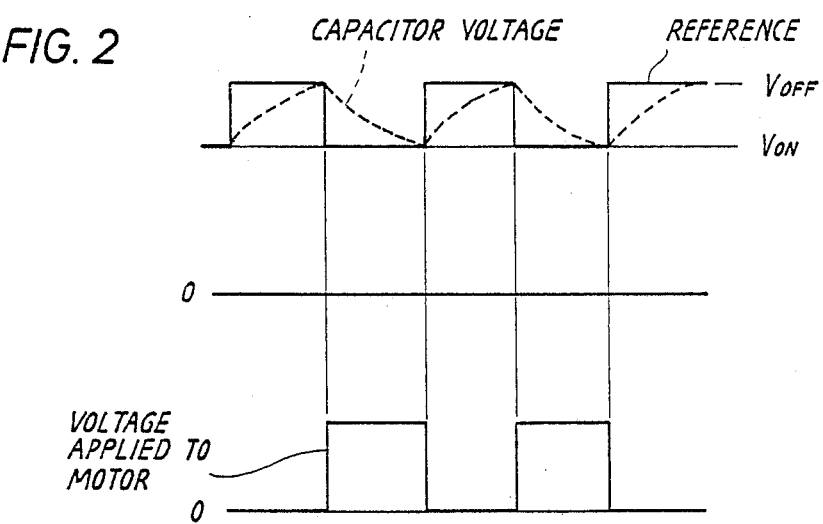
FIG. 2 is a waveform diagram illustrating the operation of the circuit of FIG. 1 when the motor is under light loads.
Figure 3:
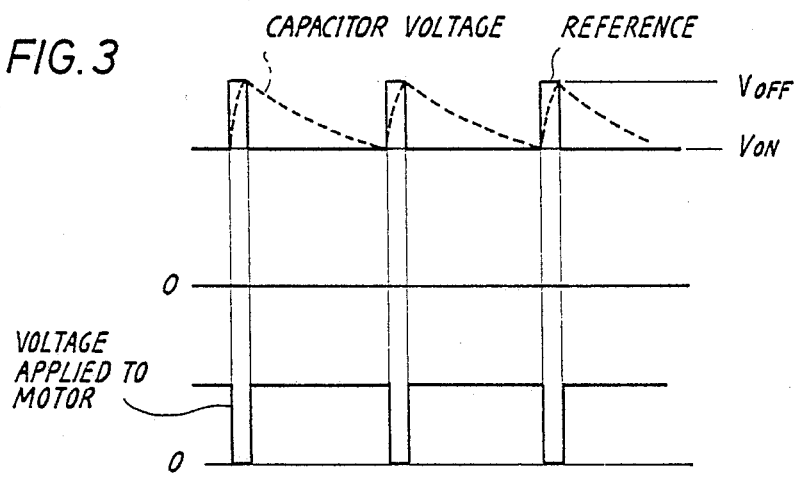
FIG. 3 is a waveform diagram illustrating the operation of the circuit of FIG. 1 when the motor is under heavy loads.

As illustrated in FIG. 2, under light motor loads the capacitor voltage at the noninverting input of operational amplifier 6 rises at a lower rate during the time the motor 2 is energized and decays at a higher rate during the time it is de-energized. Under heavy motor loads, the capacitor voltage rises at a higher rate during the time motor 2 is energized as illustrated in FIG. 3.

As the motor load increases, the on-duty period increases and the off-duty period decreases and conversely w motor load decreases the on-duty period decreases and the off-duty period increases. These variable on- and off-duty periods operate the motor to run at a constant speed under varying load.

Due to the elimination of the need to install a tachogenerator or a heat-dissipating resistor, the motor control circuit as taught by the present invention is compact in design.

It is preferred that the time constant value of the resistor 12 and capacitor 13 be determined so that they form a filter that filters out the ripple component of the counter-emf.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:
1. A speed controller for a DC motor comprising:
a semiconductor switching device connected in series with said motor and responsive to a switching control signal applied thereto for switching power to said motor from a voltage source on and off, whereby a current having an amplitude proportional to the amount of load on said motor flows in said motor when said power is switched on and a counter-electromotive force inversely proportional to said motor load is generated by said motor when said power is switched off; and
switching control means responsive to the amplitude of said current and said counter-electromotive force for generating said switching control signal which turns on said semiconductor switching device for a duration proportional to the amplitude of said current and turns off said switching device for an interval proportional to said counter-electromotive force, said switching control means comprising:
a time constant circuit including a capacitor connected in parallel with said switching device so that said switching device establishes a discharge circuit for said time constant circuit when the switching device is turned on and allows said capacitor to develop a first voltage when the switching device is turned off;
a variable reference source for generating a reference voltage variable between high and low values in response to said switching control signal; and
means for comparing said first voltage with said variable reference for generating an output selectively having high and low voltage levels dependent on the relative value of said first voltage to said variable reference and applying said output to said switching device and to said variable reference source as said switching control signal.
2. A speed controller as claimed in claim 1, wherein said time constant circuit comprises a resistor connected in series with said capacitor to form a filter for filtering out the ripple components contained in a counter-electromotive force generated by said motor.

3. A speed controller as claimed in claim 1, wherein said variable reference source comprises a potentiometer, a resistor of fixed value connected in series thereto, and switching means responsive to the control signal derived by said comparing means to establish a short circuit across said resistor.

4. A speed controller as claimed in claim 1, wherein said switching device comprises a transistor having first and second controlled electrodes connected in series with said motor and in parallel with said time constant circuit and a control electrode responsive to said switching control signal.

5. A motor control circuit for a DC motor responsive to a DC voltage source, the motor deriving a back EMF proportional to the motor speed and inversely proportional to the motor load comprising a switch in series circuit with the motor and the DC source, said switch when closed applying a resistance in series with the motor, a charge-discharge circuit including a reactance connected in series with the motor and the DC source and in shunt with the switch and the resistance so that a voltage proportional to the back EMF is applied by the motor to the circuit while the switch is open and energy stored in the reactance is dissipated in the resistance and switch while the switch is closed, whereby the circuitry develops an output voltage that increases and decreases while the switch is open and closed respectively, means for comparing the output voltage with first and second reference voltages respectively occurring while the switch is open and closed, the means for comparing deriving a bi-level signal having a first value while the output voltage exceeds the first reference voltage and a second value while the output voltage is less than the second reference voltage, the switch being responsive to the bilevel signal to cause the switch to be open and closed while the first and second levels are respectively derived, whereby the motor speed is maintained constant for varying loads.

6. The circuit of claim 5 wherein the first and second reference voltages are derived with a voltage divider including an impedance shunted by a second switch responsive to the bilevel signal so that the second switch is open and closed while the first and second levels are respectively derived.

7. A motor control circuit for a DC motor responsive to a DC voltage source, the motor deriving a back EMF proportional to the motor speed and inversely proportional to the motor load comprising a switch in series circuit with the motor and the DC source, said switch when closed applying a resistance in series with the motor, a charge-discharge circuit including a reactance connected in series with the motor and the DC source and in shunt with the switch and resistance so that a voltage proportional to the back EMF is applied by the motor to the circuit while the switch is open and energy stored in the reactance is dissipated in the switch and resistance while the switch is closed, whereby the circuit develops an output voltage that increases and decreases while the switch is open and closed respectively, a voltage divider connected across the DC source, the voltage divider including tapped first impedance means in series with another impedance means having first and second values, means for comparing the output voltage with the voltage at the tap of the first impedance means to derive a bi-level signal having first and second values in response to the output voltage being respectively above and below the voltage at the tap, means responsive to the bi-level signal for causing the another impedance means to have the first value and the switch to be open while the first level is derived and for causing the another impedance means to have the second value and the switch to be closed while the second level is derived, whereby the motor speed is maintained constant for varying loads.

8. The motor control circuit of claim 5, wherein the reactance comprises a capacitor, and the charge-discharge circuit includes a resistor and a capacitor.

9. The motor control circuit of claim 8, wherein the output voltage is derived in response to voltage developed across the capacitor.

10. The motor control circuit of claim 7, wherein the reactance comprises a capacitor, and the charge-discharge circuit includes a resistor and a capacitor.

11. The motor control circuit of claim 10, wherein the output voltage is derived in response to voltage developed across the capacitor.

* * * * *